D. T. RICKEY.
Grape-Vine Trellis.
No. 52,205.
Patented Jan. 23, 1866.
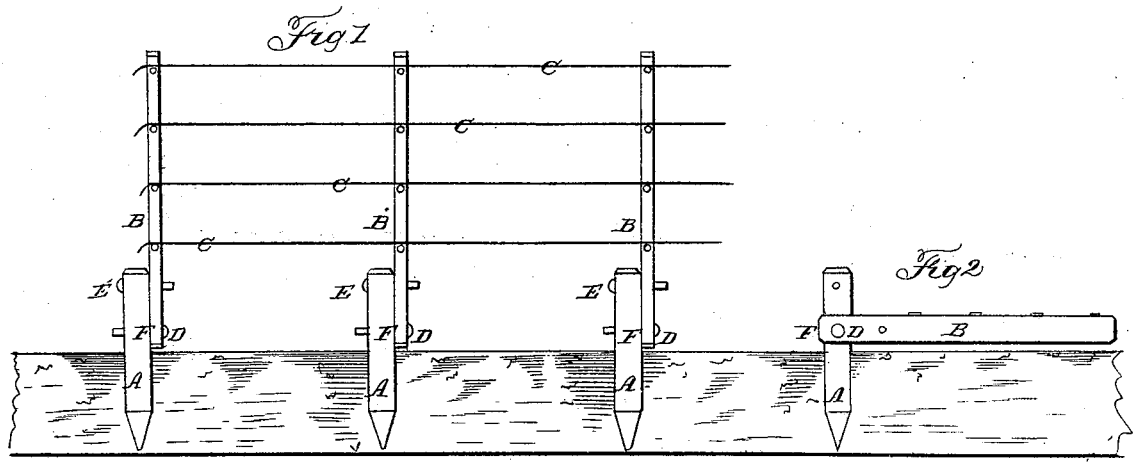

UNITED STATES PATENT OFFICE.

DAVID T. RICKEY, OF MARSHALLTOWN, IOWA.

IMPROVEMENT IN GRAPE-TRELLISES.

Specification forming part of Letters Patent No. 52,205, dated January 23, 1866.

*To all whom it may concern:*

Be it known that I, DAVID T. RICKEY, of Marshalltown, Marshall county, and State of Iowa, have invented a new and useful Improvement on a Grape-Trellis; and I do hereby declare that the following is a full, clear, and exact description of the construction and operation of the same, reference being had to the annexed drawings, making a part of this specification, in which—

Figure 1 is a front view of two sections of my grape-trellis. Fig. 2 is an end view of the same as lying upon the ground.

Similar letters of reference indicate corresponding parts in the figures.

My invention consists in a new and useful improvement on the grape-trellis, by which grape vines are lowered to the ground in the fall, so that they may be covered and protected from the frosts of winter and raised to an upright position in the spring, thus obviating the necessity of removing the grape vines from the trellis.

In the accompanying drawings, B may represent wooden posts of suitable dimensions, A may represent wooden posts pointed at the lower end.

G represents wire strands upon which the grape-vines hang. The wires C may be fastened to the posts B in any convenient way, either by staples driven over the wires, by nails driven through loops made in the wire, or the wire may be drawn through holes bored through the posts. The posts A are driven into the ground a sufficient depth to hold the trellis against high winds.

The hinged pins D are put through the posts A and B in a loose manner, so as to allow the trellis to be raised and lowered without twisting or breaking the said pins.

The pins E are used only when the trellis is in its upright position, as in Fig. 1. They are put through the posts A and B to hold it upright, and are taken out when the trellis is to be lowered to the ground.

Having thus described my invention, the following is what I claim as new and desire to secure by Letters Patent:

The hinge joint F, as applied to the grape-trellis, substantially as herein described.

DAVID T. RICKEY.

Witnesses:
H. C. HENDERSON,
J. W. HARVEY.